US011506109B2

(12) United States Patent
Boffelli

(10) Patent No.: US 11,506,109 B2
(45) Date of Patent: Nov. 22, 2022

(54) HYBRID APPARATUS FOR CONTROLLING THE ROTATION OF A FAN FOR COOLING THE COOLING FLUID OF A VEHICLE

(71) Applicant: BARUFFALDI S.P.A., Tribiano (IT)

(72) Inventor: Piercarlo Boffelli, Tribiano (IT)

(*) Notice: Subject to any disclaimer, the term of this patent is extended or adjusted under 35 U.S.C. 154(b) by 448 days.

(21) Appl. No.: 16/619,023

(22) PCT Filed: Jun. 14, 2018

(86) PCT No.: PCT/IB2018/054364
§ 371 (c)(1),
(2) Date: Dec. 3, 2019

(87) PCT Pub. No.: WO2018/229705
PCT Pub. Date: Dec. 20, 2018

(65) Prior Publication Data
US 2021/0079832 A1    Mar. 18, 2021

(30) Foreign Application Priority Data

Jun. 15, 2017  (IT) .................. 102017000066329
Jun. 15, 2017  (IT) .................. 102017000066356

(51) Int. Cl.
*F01P 7/04*    (2006.01)
*F01P 5/04*    (2006.01)
(Continued)

(52) U.S. Cl.
CPC .............. *F01P 7/048* (2013.01); *F01P 5/043* (2013.01); *F01P 7/084* (2013.01); *F04D 25/026* (2013.01);
(Continued)

(58) Field of Classification Search
CPC .. F01P 7/048; F01P 5/043; F01P 7/084; F04D 25/026; F04D 25/062; F04D 25/068; F04D 25/059
See application file for complete search history.

(56) References Cited

U.S. PATENT DOCUMENTS 6,013,003 A * 1/2000 Boffelli ................... F01P 7/046
                                                      192/84.21
6,921,250 B2 * 7/2005 Boffelli ................. F04D 25/022
                                                       416/169 A
(Continued)

FOREIGN PATENT DOCUMENTS

WO    WO-2011006595 A1 *  1/2011  .............. F01P 5/04
WO    WO-2018229670 A1 * 12/2018  .............. F01P 5/04

*Primary Examiner* — Nathan C Zollinger

(57) ABSTRACT

Apparatus for controlling the rotation about a longitudinal axis (X-X) of a fan (1) for cooling the cooling fluid contained in the radiator of a vehicle, comprising:—a fixed support sleeve (3), internally hollow and extending parallel to the longitudinal axis (X-X) of rotation of the fan;—a bell member (1a) for supporting the fan, mounted on the outer race (2a) of a bearing (2), the inner race (2b) of which is keyed onto the support sleeve (3);—an electromagnetic friction coupling (10) arranged between the bell member (1a) and movement receiving means (4) suitable for connection to the driving shaft of the vehicle;—an electric motor (20) for generating a rotational movement independent of the driving shaft of the vehicle, comprising a stator (21) and a rotor (22);—a first rear flange (3a) integral with the sleeve (3) and designed to support an electromagnet (12) of the electromagnetic friction coupling; a second front flange (40) integral with the sleeve (3) and designed to support the stator (21) of the electric motor (20) and a unit (30; 130) for controlling and electronically driving the electric motor (20), arranged in a position radially on the inside of the bell member (1a) for supporting the fan.

15 Claims, 4 Drawing Sheets

(51) Int. Cl.
*F01P 7/08* (2006.01)
*F04D 25/02* (2006.01)
*F04D 25/06* (2006.01)
*F04D 29/059* (2006.01)

(52) U.S. Cl.
CPC ......... *F04D 25/062* (2013.01); *F04D 25/068* (2013.01); *F04D 29/059* (2013.01)

(56) References Cited

U.S. PATENT DOCUMENTS

| | | | | |
|---|---|---|---|---|
| 8,807,313 | B2* | 8/2014 | Roby | F01P 5/04 |
| | | | | 192/58.61 |
| 10,738,681 | B2* | 8/2020 | Boffelli | F04D 29/362 |
| 2006/0131120 | A1* | 6/2006 | Boffelli | F01P 7/081 |
| | | | | 192/48.2 |

* cited by examiner

HYBRID APPARATUS FOR CONTROLLING THE ROTATION OF A FAN FOR COOLING THE COOLING FLUID OF A VEHICLE

BACKGROUND SUMMARY

The present invention relates to a hybrid apparatus for controlling the rotation of fans for cooling the cooling fluid contained in the radiator of motor vehicles.

It is known in the technical sector of motor vehicles that there exists the need to generate an air flow by means of a fan, which is arranged at the rear of the radiator in the direction of travel of the vehicle and connected to the driving shaft thereof, said fan, when it is rotated, forcing air onto the radiator and causing the heat to be transferred from the cooling fluid to the external environment.

It is also known that said fan must be rotated only when the cooling fluid reaches a certain predefined temperature detected by means of a thermostat which operates an electromagnetic friction coupling, closing of which starts rotation of the fan.

In greater detail it is required that a motor vehicle fan should be able to rotate:
  at a lower speed than that of the driving shaft for cooling in low external temperature conditions;
  at a speed the same as or even higher than that of the driving shaft at higher external temperatures or during use in severe conditions which result in overheating of the engine;
  at zero speed, namely with the fan which does not rotate at all and remains in an idle condition with respect to the driving shaft, for particularly low temperatures where further cooling is not useful or even damaging.

In order to ensure these operating conditions, in the art apparatus for controlling operation of the fan are known to exist, said apparatus comprising an electromagnetically controlled friction coupling arranged between the fan and means for generating the rotational movement which are connected to the shaft of the combustion engine, as well as electrical devices able to control the rotation of the fan independently of the combustion engine shaft and with a programmable number of revolutions.

Although fulfilling the function of cooling the cooling fluid in the vehicle, these apparatus are however subject to malfunctioning and inefficient operation due to the fact that the connections between the electrical devices for controlling rotation and the associated electronic control drives situated at a distance therefrom generate, when the fan is in operation, eddy currents which interfere with correct operation of the control apparatus and in particular the electromagnetic friction coupling. An example of such apparatus is illustrated in WO2011006595, which describes an apparatus according to the preamble of Claim 1, wherein the rotational movement is received from a coaxial shaft arranged in a position radially on the inside of the friction coupling and the electric motor. In this configuration, the positioning of any electronic drive for the electrical devices does not create any problems since the fixed part of the apparatus is arranged in a radially outer position and the stator of the electric motor fixed to it is easily accessible. This apparatus however has the drawback that it has an excessively large volume in the radial direction which is not always compatible with the dimensions of the engine compartment of vehicles such as vans and lorries.

In addition, in the case where the operating conditions are such that the cells of the radiator accumulate loose debris, the known apparatus are unable to solve the problem of blockage of the radiator cells and therefore lack of cooling of the fluid contained inside said radiator.

The technical problem which is posed, therefore, is that of providing an apparatus for controlling the rotation of fans for cooling the cooling fluid of vehicles, which is able to solve or at least partially overcome the aforementioned problems of the prior art.

In connection with this problem it is also required that this apparatus should have small dimensions, in particular in the radial direction.

A further desirable feature is that the apparatus should be easy and inepxensive to produce and assemble and be able to be easily installed at any user location using normal standardized connection means.

These results are achieved according to the present invention by an apparatus for controlling the rotation of fans for cooling the cooling fluid contained in the radiator of vehicles, in particular agricultural tractors and off-road vehicles, according to the characteristic features of Claim 1.

BRIEF DESCRIPTION OF THE DRAWINGS

Further details may be obtained from the following description of a non-limiting example of embodiment of the subject of the present invention provided with reference to the attached drawings in which.

DETAILED DESCRIPTION

Figure 1:
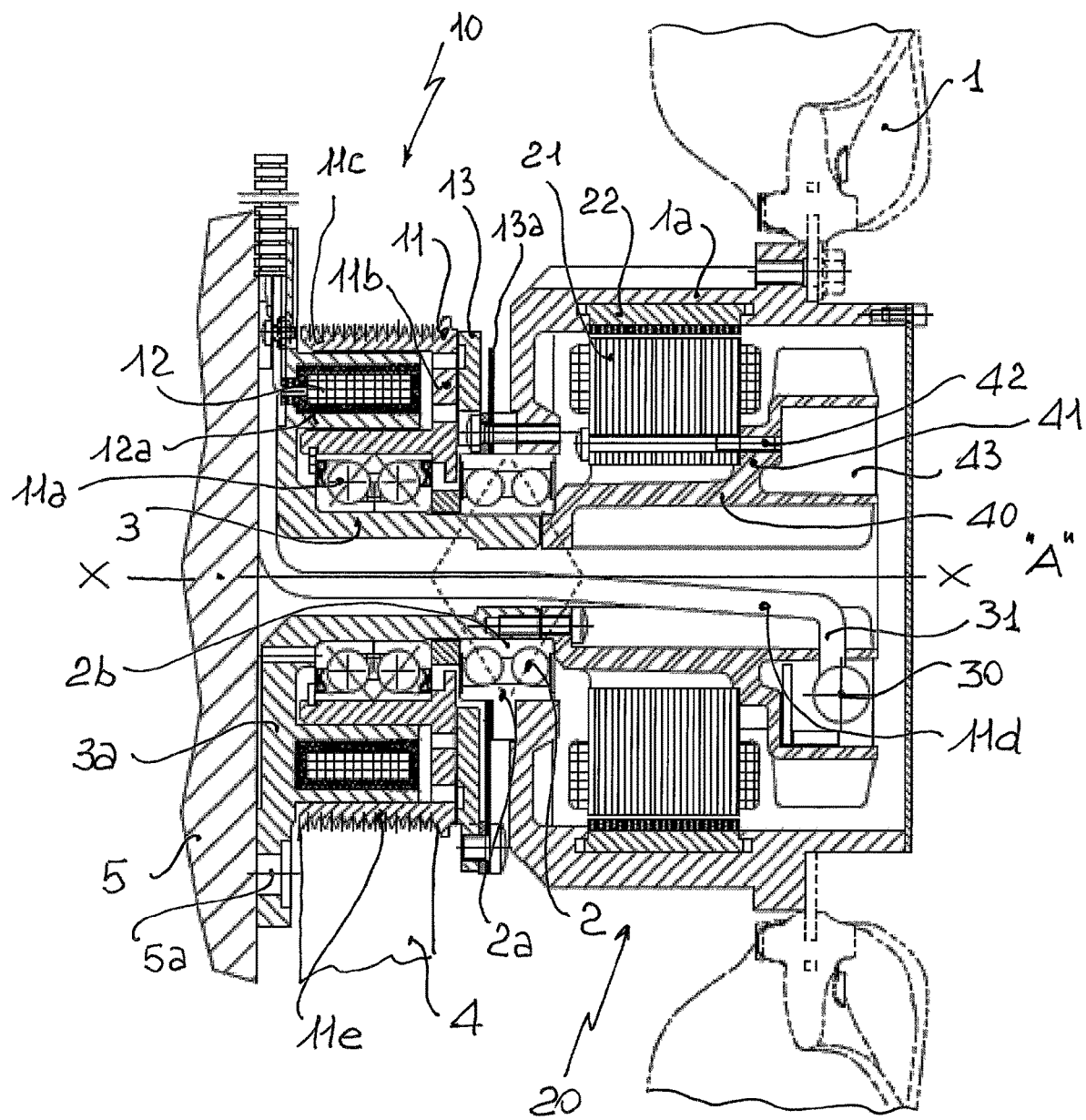
FIG. 1: shows an axial vertical section through a first example of embodiment of the apparatus according to the present invention.

As shown in FIG. 1 and assuming solely for the sake of easier description without a limiting meaning a longitudinal axis X-X corresponding to the axis of rotation of a fan 1, as well as a front part A situated close, during use, to the radiator of the vehicle (indicated by a dot-dash line) and a rear part opposite to the front part in the longitudinal direction X-X, the apparatus for controlling the rotation of the fan according to the invention is designed such that:
  the fan 1 is integral with a bell member 1a mounted on the outer race 2a of a bearing 2, the inner race 2b of which is keyed onto a fixed sleeve 3 extending parallel to the longitudinal axis X-X and preferably coaxial therewith as in the example shown;
  the sleeve 3 is internally hollow so as to allow the electrical connections to pass through and its rear end is joined together—preferably as one piece—with a first support flange 3a which can be fastened to the base 5 of the engine by means of fixing means, for example of the screw type 5a;

On the axially opposite side to that which is connected to the fan 1, the supporting bell member 1a is connected together with the armature 13 of an electromagnetic friction coupling 10 which comprises:

a fixed electromagnet 12 which is housed inside an associated seat 12a of the flange 3a of the sleeve 3 and preferably electrically connected, by means of cables 11d, to a thermostat (not shown) for measuring the temperature of the cooling fluid in the radiator;

a rotor 11 arranged axially facing the electromagnet 12, between the latter and the armature 13, and mounted on a bearing 11a keyed onto the sleeve 3; in greater detail the rotor 11 has an annular part 11b forming a disc for circulation of the magnetic flux induced by the electromagnet and a radially outer axial extension 11c configured as means for receiving the movement arranged in a position radially on the outside of the electromagnet, such as a pulley 11e, formed by radially outer teeth, suitable for engagement with a multi-groove belt 4 connected to the driving shaft, directly or via transmissions, and therefore able to cause rotation of the rotor 11;

the armature 13 is arranged axially on the opposite side of the rotor 11 with respect to the electromagnet 12 and is connected by means of a resilient membrane 13a to the bell member 1a of the fan 1; with this connection the armature 13 is able to perform movements in the axial direction towards/away from the rotor 11, while remaining locked in relative rotation with the bell member 1a. As shown, the bell member 1a is also joined together with the rotor 22 of an electric motor 20, the stator 21 of which is mounted on a second support flange 40 fastened to the front end of the support sleeve 3; the second flange 40 has a shaped radial extension 41 to which the stator 21 is fixed by means of screw-type fixing means 42; the radial extension 41 defines a coaxial seat 43 for housing an electronic drive and control unit 30 of the electric motor 20, which is connected by means of cables 32 passing through the flange 40 to the electric motor 20 and supplied with power via the electrical connections 31.

In this way the fan 1 can be connected by means of the bell member 1a both to the electromagnetic friction coupling 10 and to the electric motor 20 which is current-controlled by means of the associated control unit 30.

Figure 2:
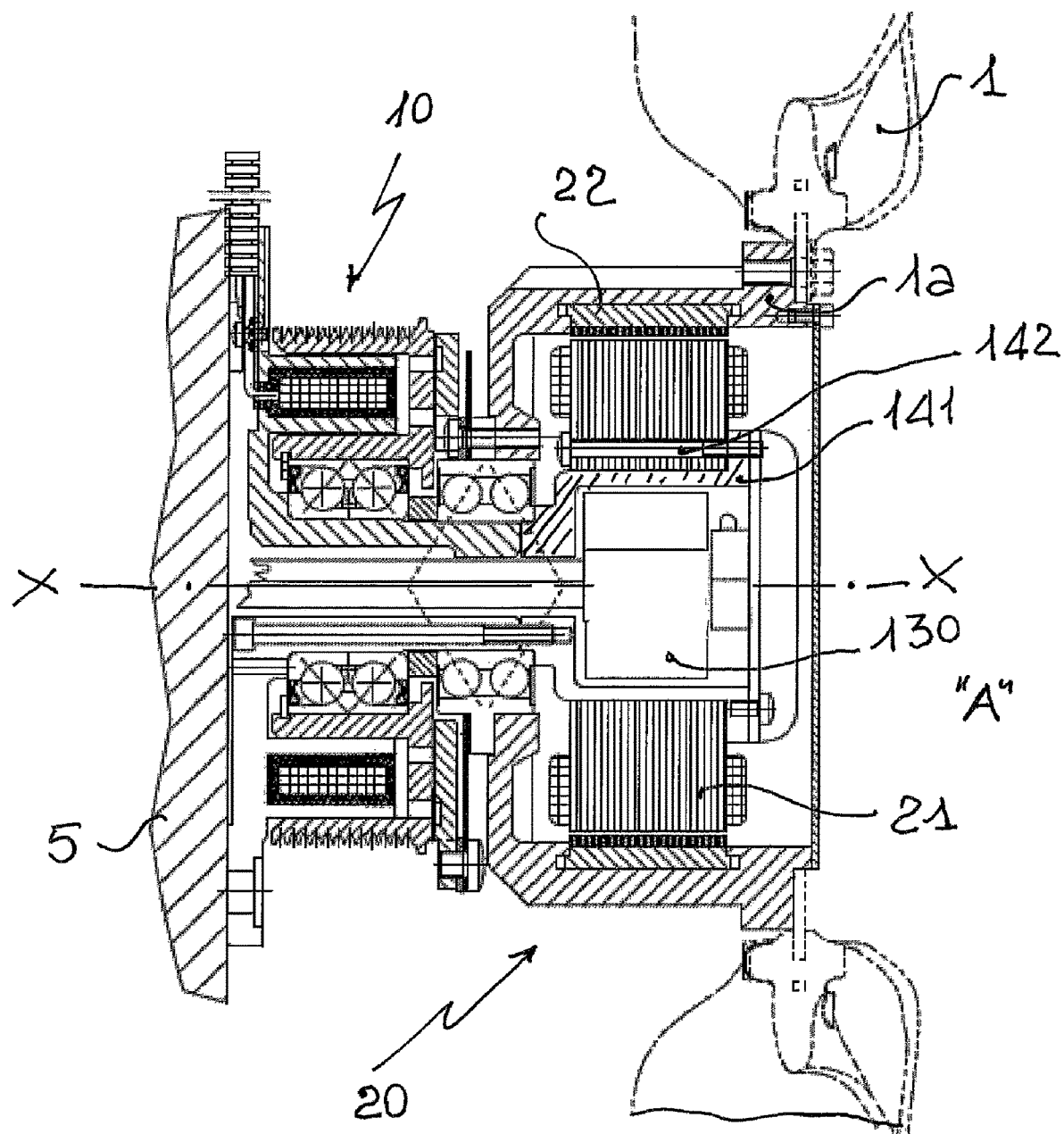
FIG. 2: shows an axial vertical section through a second example of embodiment of the apparatus according to the present invention.

With reference to FIG. 2, according to a second embodiment of the apparatus of the invention, the electronic drive and control unit 130 of the electric motor 20 is arranged in an axially inner position coaxial with the stator 21 of the electric motor and preferably concentric therewith. As shown, preferably the second flange 140 supports the electronic drive unit 130 and the stator 21 in a radially inner position and radially outer position, respectively.

In this configuration also, the second flange 140 may comprise a radial extension 141 to which the stator 21 is fixed by means of through-screws 142 engaging with a corresponding female thread of the radial extension 141.

As shown in the examples, it is envisaged preferably that the electric motor is arranged in a position axially on the outside of the means for receiving the movement 4 and/or the electromagnetic friction coupling, which allows the radial dimensions of the apparatus to be further reduced.

In the case of both the configurations, operation of the fan is dependent on the activation of one or the other of the two movement transmission/generating devices:

in conditions where the electromagnet 12 is not excited and the motor 20 de-energized, the bell member 1a is disconnected from all the movement sources and the fan 1 is at a standstill in the idle condition;

in conditions where the electromagnet 12 is excited and the motor 20 de-energized, the armature 13 is recalled against the rotor 11 and the fan 1 is rotated with a number of revolutions equal or proportional to the number of revolutions of the driving shaft to which it is connected via the belt 4; in this condition the friction coupling causes rotation of the electric rotor, which induces a current on the stator, generating recoverable energy;

in conditions where the electromagnet 12 is not excited and the motor 20 energized, the armature 13 and therefore the fan 1 are rotated by the rotor of the motor 20 with a number of revolutions determined by the control unit 30 according to the actual cooling requirement.

In both embodiments the fan rotates in the direction anticlockwise in the example of the Figure—such as to draw air from the outside towards the surface of the radiator arranged in front of the fan with respect to the direction of travel of the vehicle; according to the invention it is envisaged however that the electric motor 20 may be powered with opposite currents so as to cause a rotation of the rotor 22 of the electric motor and therefore the fan 1 in the direction—clockwise in the example—of a thrusting force of the air acting in the direction of travel of the vehicle so that, crossing the radiator from the inside towards the outside, the dirt which has accumulated on the surface of the radiator during the cooling cycles is removed, thus restoring the full functionality of the radiator which has been reduced in the meantime owing to the dirt.

It is therefore clear how the apparatus according to the invention is able to cause operation of the fan both so as to cool the cooling fluid contained in the radiator and, if convenient or required, so as to perform cleaning of the surface of the said radiator, which cleaning may take place also during normal travel of the vehicle and therefore without the vehicle stoppage downtime resulting from the need to cool the radiator in order to be able to access it manually for cleaning thereof.

The second support flange joined together with the sleeve 3 allows the electronic drive and control unit of the electric motor to be housed radially on the inside of the bell member 1a of the apparatus for controlling rotation of the fan, thus limiting the disturbances and eddy currents which are generated when the motor is controlled by a control unit arranged at a distance therefrom and connected by means of electric cables which pass through the area of the apparatus occupied by the electromagnetic friction coupling, while at the same time limiting the dimensions, in particular the radial dimensions.

The configuration with a double support flange, where the second flange is fastened at the front to the sleeve by means of axial fixing means, facilitates mounting of the apparatus since the assembly composed of the stator and the electronic drive unit of the electric motor may be preassembled and then fixed in front of the sleeve 3 by means of the second flange 40, thus enabling easier mounting of the apparatus.

It is also envisaged that the electric motor may be supercharged for short periods of time in order to increase both the torque and the speed thereof so as to improve the efficiency of removal of the dirt from the surface of the radiator and/or manage extreme cooling situations without having to resort to engagement of the friction coupling.

The present description relates furthermore to a hybrid apparatus joined together with the crankshaft of an engine and designed to control the rotation of fans for cooling the cooling fluid contained in the radiator of motor vehicles.

With reference to the need, described in the introduction, to generate an air flow by means of the fan for cooling the cooling fluid in radiators of motor vehicles, depending on the temperature of the said fluid detected, it is in fact also known that the existing apparatus are not suitable for controlling a fan mounted on a crankshaft connected to the shaft of the combustion engine.

A further technical problem dealt with in the present description is therefore that of providing an apparatus for controlling the rotation of fans for cooling the cooling fluid of vehicles, mounted on the crankshaft of the engine, depending on the actual cooling requirement. In connection with this problem it is particularly desirable that such an apparatus should have small dimensions, in particular radial dimensions, should be easy and inexpensive to produce and assembly and should be able to be installed at any user location using normal standardized connection means.

These results may be obtained with an apparatus for controlling the rotation about a longitudinal axis of a fan designed to be mounted coaxially with a crankshaft of a vehicle for cooling the cooling fluid contained in the radiator of the vehicle, comprising:
- a driving shaft designed to be joined together with the crankshaft of the vehicle;
- an element during use integral with the fan and mounted idle on the driving shaft;
- a first device for transmission of the movement generated by the driving shaft to the element integral with the fan, and
- a second device for generating and transmitting a movement independent of that of the driving shaft to the element integral with the fan; wherein said first and second movement transmission/generating devices are mounted coaxially on the driving shaft.

The first device for transmission of the movement from the driving shaft to the fan may be a friction coupling, which preferably comprises an electromagnet included in a support designed to be fastened to the base of the combustion engine and mounted on the outer race of a first bearing, the inner race of which is keyed onto the driving shaft; a mechanical rotor, joined together with the element integral with the fan and mounted on the outer race of a second bearing, the inner race of which is keyed onto the driving shaft; and an armature axially arranged on the opposite side of the rotor with respect to the electromagnet and connected by means of a resilient membrane to the driving shaft.

The mechanical rotor may also preferably comprise a radially inner sleeve mounted on the second bearing, an annular part forming a disc for circulation of the magnetic flux induced by the electromagnet and a radially outer edge extending in the axial direction and designed to engage with the fan, so as to form during use the element integral with the fan. According to a preferred embodiment, a flexible joint is arranged between the armature and the driving shaft.

The second movement generation and transmission device may comprise an electric motor with a stator and an electric rotor, radially on the outside of the stator, joined together with a ring designed to be fastened to the element integral during use with the fan. The stator is preferably supported by the same support which supports the electromagnet, and the ring joined together with the electric rotor may have an outer edge extending in the radial direction and designed to be fastened to the corresponding annular edge extending in the radial direction of the mechanical rotor and integral during use with the fan. The electric motor may be designed to operate the fan in two opposite directions of rotation, i.e. for drawing in cooling air or for force-blowing air for cleaning the radiator.

The apparatus may comprise a drive for controlling the electric motor, preferably housed in a flange fastened by means of axial screws to the same support which carries the electromagnet of the coupling and the stator of the electric motor, the electronic drive and the stator being preferably arranged in a respectively radially inner and radially outer position. The electronic drive of the electric motor may also be arranged in an axially inner position coaxial with the stator of the electric motor and preferably concentric therewith.

In an advantageous embodiment, the friction coupling causes rotation of the mechanical rotor and the electric rotor integral therewith, this inducing a current on the stator and generating recoverable energy.

Preferably, the mechanical rotor and the ring which carries the electric rotor are made as one piece in a single body which forms the element integral during use with the fan.

Figure 3:
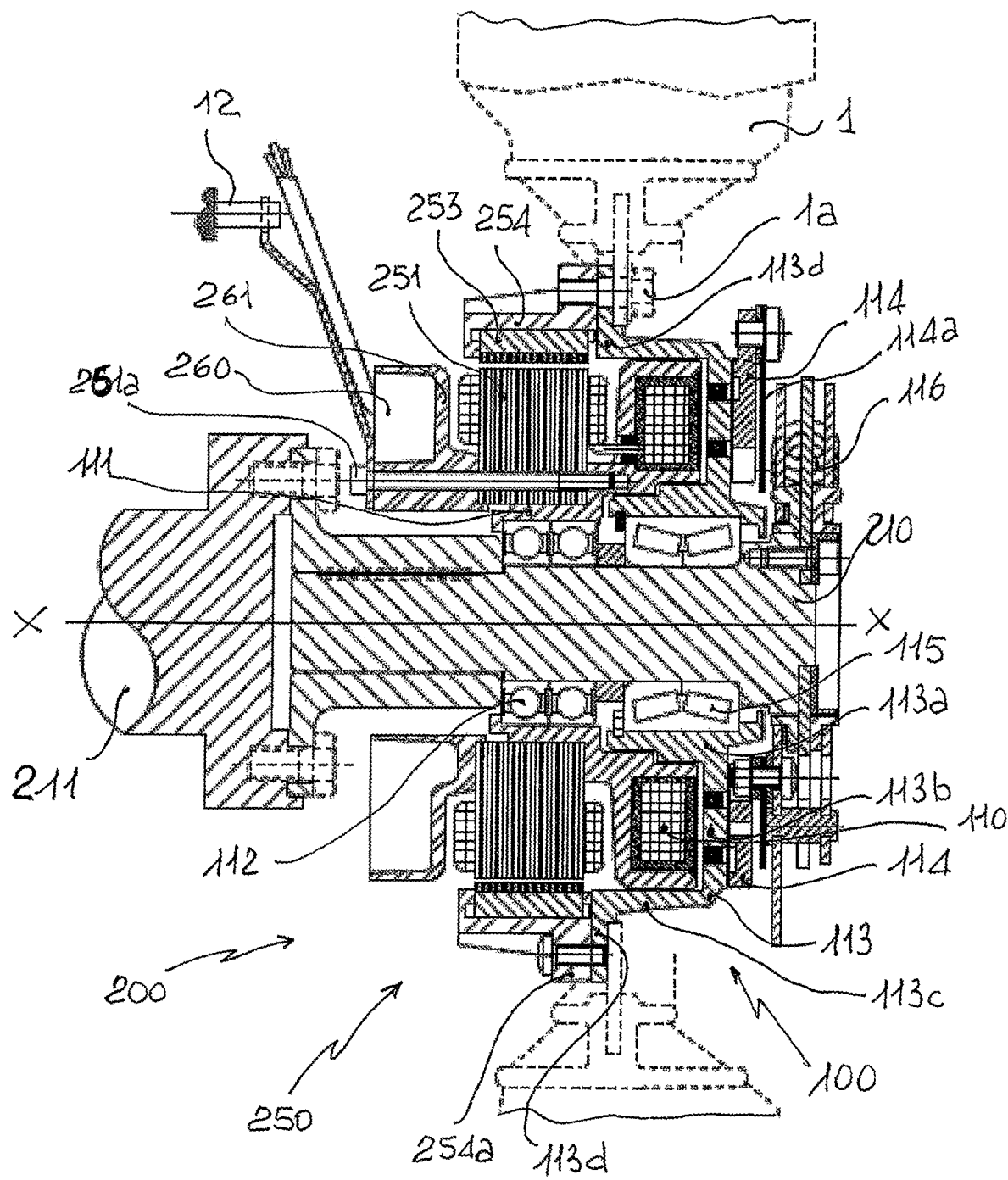
FIG. 3: shows an axial vertical section through a first example of embodiment of an apparatus for controlling a fan able to be mounted coaxially with a crankshaft.

Further details may be obtained from the following description of non-limiting examples of embodiment provided with reference to the accompanying drawings. As shown in FIG. 3 and assuming solely for the sake of easier description without a limiting meaning a longitudinal axis X-X corresponding to the axis of rotation of a fan 1, as well as a front part A situated close, during use, to the radiator of the vehicle and a rear part opposite to the front part in the longitudinal direction X-X, the apparatus for controlling the rotation of the fan comprises:
- a support shaft 210 connected to the crankshaft 211 of the combustion engine with which it is integral, rotating at the same number of revolutions; below the support shaft will be referred to as driving shaft 210;
- a first device 100 for transmission of the movement generated by the driving shaft 210, and
- a second device 200 for generating a movement independent of that of the driving shaft 210; said first movement transmission device 100 and second movement generating device 200 being mounted coaxially on the driving shaft 210.

In detail:
the first device 100 for transmission of the movement from the driving shaft 210 to the fan 1 comprises:
- a friction coupling, preferably of the electromagnetically controlled type, which comprises:
- an electromagnet 110 included in a support 111 fastened to the base 12 of the combustion engine; the support 111 of the electromagnet is mounted on the outer race of a first bearing 112, the inner race of which is keyed onto the driving shaft 210;
- a mechanical rotor 113 formed by a sleeve 113*a* situated radially on the inside and mounted on the outer race of a second bearing 115, the inner race of which is keyed onto the driving shaft 210; the rotor 113 has an annular part 123*b* forming a disc for circulation of the magnetic flux induced by the electromagnet and radially outer edge 113*c* extending in the axial direction;
- the outer edge 113*a* of the rotor 113 has an annular edge 113*d* extending in the radial direction and designed to be integrally joined together with the fan 1, for example by means of axial screws 1*a;*
- the armature 114 is arranged axially on the opposite side of the rotor 113 with respect to the electromagnet 110 and is connected by means of a resilient membrane 114*a* to the driving shaft 210; with this connection the armature 114 is able to perform movements in the axial direction towards/away from the rotor 113, while remaining locked in relative rotation with the driving shaft 210.

As can be seen, the armature 114 has a driving function, while the rotor 113 is driven.

Preferably a flexible joint 116 designed to reduce the vibrations induced by the driving shaft is arranged between the armature 114 and the driving shaft 210.

The second movement generating device 200 comprises:

an electric motor 250, the stator 251 of which is mounted on the same support 111, fixed to the base 12 of the combustion engine, which supports the electromagnet 110, and the electric rotor 253 of which, situated radially on the outside of the stator 251, is joined together with a ring 254 which has an outer edge 254*a* extending in the radial direction and designed to be fastened to the corresponding annular edge 113*d* extending in the radial direction of the mechanical rotor 113 which carries the fan 1;

preferably the same screws which lock the fan together with the mechanical rotor also lock the ring 254 carrying the electric rotor 253 thereto.

Figure 4:
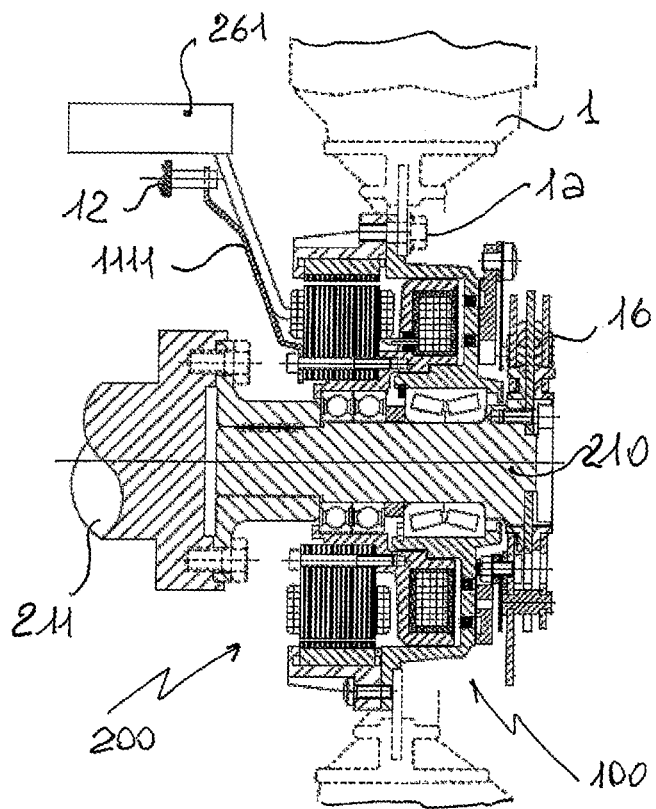
FIG. 4: shows an axial vertical section through a second example of embodiment of an apparatus for controlling a fan able to be mounted coaxially with a crankshaft.

The electric motor 250 is connected to a drive 260 for controlling the motor; as shown in the preferred embodiment of FIG. 3 it is envisaged that the drive 260 may be housed inside a flange 261 fastened by means of axial screws 261*a* to the said support 111, fixed to the base 12 of the combustion engine which carries the electromagnet of the coupling 100 and the stator 251 of the electric motor, forming in this case a single and compact assembly together with the apparatus and avoiding possible disturbances which arise when the drive is connected at a distance from the electric motor; as shown in FIG. 4, it is also envisaged that the control drive 261 may be positioned on the outside of the support 111 of the stator 251, the connection cables being advantageously arranged along a flange 1111*a* for fastening said support 1111 to the base 12.

Although not shown, it is also envisaged that the electronic drive of the electric motor may be arranged in an axially inner position which is coaxial with the stator of the electric motor and preferably concentric therewith. In this case, preferably, the support fixed to the pump body supports the electronic drive and the stator of the motor in a radially inner and radially outer position respectively.

Figure 5:
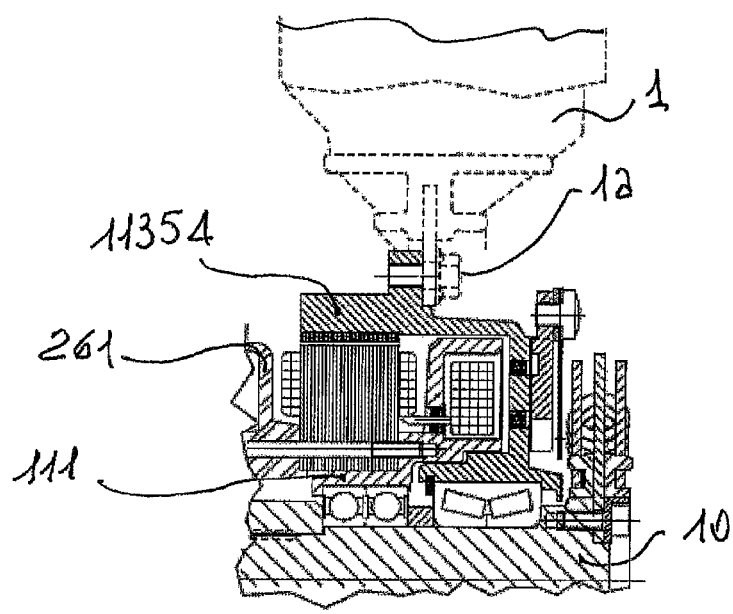
FIG. 5: shows an axial vertical section through a third example of embodiment of an apparatus for controlling a fan able to be mounted coaxially with a crankshaft.

As shown in FIG. 5 a further embodiment of the apparatus is envisaged whereby the mechanical rotor 113 and the ring 254 which carries the electric rotor 253 are formed as one piece in a single body 11354, further reducing the overall number of parts of the apparatus.

With reference to these configurations of the apparatus the operating principle of the fan is as follows:

in conditions where the electromagnet 110 is not excited and the motor 250 de-energized, the fan 1 is disconnected from all the movement sources and therefore remains at a standstill in the idle condition;

in conditions where the electromagnet 110 is excited and the motor 250 is de-energized, the armature 114 is recalled against the rotor 113 to which it transmits the movement of the driving shaft 210 and the fan 1 is rotated with a number of revolutions equal to the number of revolutions of the driving shaft;

in this operating condition, the electric rotor integral joined to the mechanical rotor is rotationally driven by the friction coupling and induces a current on the stator, thus generating recoverable and utilizable energy;

in conditions where the electromagnet 110 is not excited and the motor 250 energized, the fan 1 is rotated by the rotor 253 of the motor 250 via the ring 254 and with a number of revolutions determined by the drive 2602 according to the actual cooling requirement.

In both the embodiments the fan rotates in the direction—anticlockwise in the example of the Figure—such as to draw air from the outside towards the surface of the radiator arranged in front of the fan with respect to the direction of travel of the vehicle; according to the invention it is envisaged however that the electric motor 250 may be powered with opposite currents so as to cause a rotation of the rotor 253 of the electric motor and therefore the fan 1 in the reverse direction—clockwise direction in the example—of a thrusting force of the air acting in the direction of travel of the vehicle so that, crossing the radiator from the inside towards the outside, the dirt which has accumulated on the surface of the radiator during the cooling cycles is removed, thus restoring the full functionality of the radiator which has been reduced in the meantime owing to the dirt.

It is therefore clear how the apparatus according to the invention is able to cause operation of a fan mounted coaxial with the crankshaft both so as to cool the cooling fluid contained in the radiator and, if convenient or required, so as to perform cleaning of the surface of the said radiator, which cleaning may take place also during normal travel of the vehicle and therefore without the vehicle stoppage downtime resulting from the need to cool the radiator in order to be able to access it manually for cleaning thereof.

It is also envisaged that the electric motor may be supercharged for short periods of time in order to increase both the torque and the speed thereof so as to improve the efficiency of removal of the dirt from the surface of the radiator and/or manage extreme cooling situations without having to resort to engagement of the friction coupling.

According to tests carried out it is estimated that the current supplied by the battery of the combustion engine may be 12V or 24V dc, i.e. sufficient to allow rotation of the fan up to about 50% of the maximum speed which can be produced with connection to the combustion engine which, above these values, is brought into play by means of the friction coupling. Although described in connection with a number of embodiments and a number of preferred examples of implementation of the invention, it is understood that the scope of protection of the present patent is defined solely by the claims below.

The invention claimed is:

1. An apparatus for controlling the rotation about a longitudinal axis (X-X) of a fan (1) for cooling a cooling fluid contained in a radiator of a vehicle, comprising:
   a fixed support sleeve (3), internally hollow and extending parallel to the longitudinal axis (X-X) of rotation of the fan;
   a bell member (1*a*) for supporting the fan;
   an electromagnetic friction coupling (10), arranged between the bell member (1*a*) and movement receiving means (4) for connection to a driving shaft of the vehicle;
   an electric motor (20) for generating a rotational movement independent of the driving shaft of the vehicle, comprising a stator (21) and a rotor (22);
   a first rear flange (3*a*) integral with the sleeve (3) and designed to support an electromagnet (12) of the electromagnetic friction coupling; and
   a second flange (40), integral with the support sleeve (3) and designed to support the stator (21) of the electric motor (20) and to support a control unit (30; 130) for electronically controlling and driving the electric motor (20), arranged in a position radially on the inside of the bell member (1a) supporting the fan;

wherein the bell member (1a) is mounted on an outer race (2a) of a bearing (2), an inner race (2b) of which is keyed onto the support sleeve (3); and wherein the movement receiving means are arranged in a position radially on the outside of the electromagnet friction coupling.

2. The apparatus according to claim 1, wherein the second flange (40) comprises a seat for housing the control unit (30).

3. The apparatus according to claim 1, wherein the control unit (30) for electronically controlling and driving the electric motor (20) is arranged in a position axially on the outside of the stator (21).

4. The apparatus according to claim 1, wherein the control unit (130) for electronically controlling and driving the electric motor (20) is arranged in a position axially on the inside of the stator (21).

5. The apparatus according to claim 4, wherein the control unit (130) is coaxial with the stator (21).

6. The apparatus according to claim 1, wherein the second flange (40) has a shaped radial extension (41) to which the stator (21) is fixed by means of screw-type fixing means (42).

7. The apparatus according to claim 1, wherein the second flange (40) is axially joined to a front end of the sleeve (3) by means of fixing means.

8. The apparatus according to claim 1, wherein said rotor of the electric motor (20) is fastened to the bell member for supporting the fan.

9. The apparatus according to claim 1, wherein the electric motor (20) is supercharged for short time intervals.

10. The apparatus according to claim 1, wherein the electric motor is programmed so as to be alternately rotatable in a first direction as to cause a rotation of the fan (1) in the first direction suitable for drawing air from the environment and forcing it through the radiator (6) or in a second, opposite direction such as to cause rotation of the fan (1) in the opposite direction suitable for forcing air through the radiator (6) towards the external environment.

11. The apparatus according to claim 1, wherein said electromagnetic friction coupling (10) comprises:

a mechanical rotor (11) arranged facing the electromagnet (12) and mounted on a bearing (11a) keyed onto the sleeve (3);

an armature (13) arranged in the axial direction on the opposite side of the rotor (11) with respect to the electromagnet (12), and connected by means of a resilient membrane (13a) to the bell member (1a) supporting the fan (1).

12. The apparatus according to claim 11, wherein said mechanical rotor (11) has an annular part (11b) forming a disc for circulation of the magnetic flux induced by the electromagnet and an axial end extension (11c) configured as the movement receiving means.

13. The apparatus according to claim 1, wherein in conditions where the electromagnet is excited, the friction coupling causes rotation of the electric rotor inducing a current on the stator and generating recoverable energy.

14. The apparatus according to claim 5, wherein the control unit (130) is concentric with the stator (21).

15. The apparatus according to claim 12, wherein the movement receiving means comprise a radially external toothing suitable for engagement with a multi-groove belt (4) for connection to the driving shaft of the vehicle.

* * * * *